June 29, 1965   R. E. KARCHER, JR., ETAL   3,191,745
CONVEYORS
Filed April 26, 1963   4 Sheets-Sheet 2
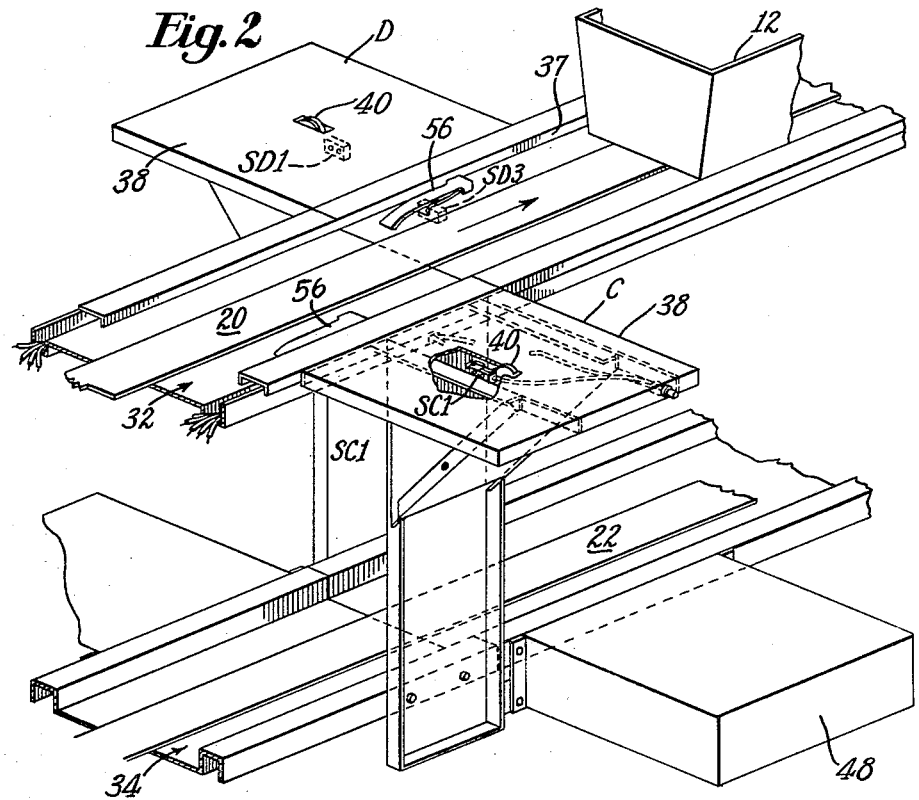
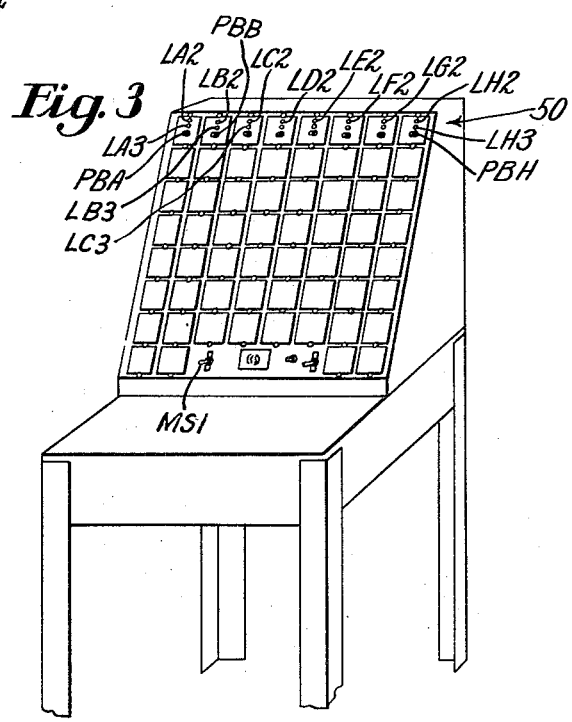

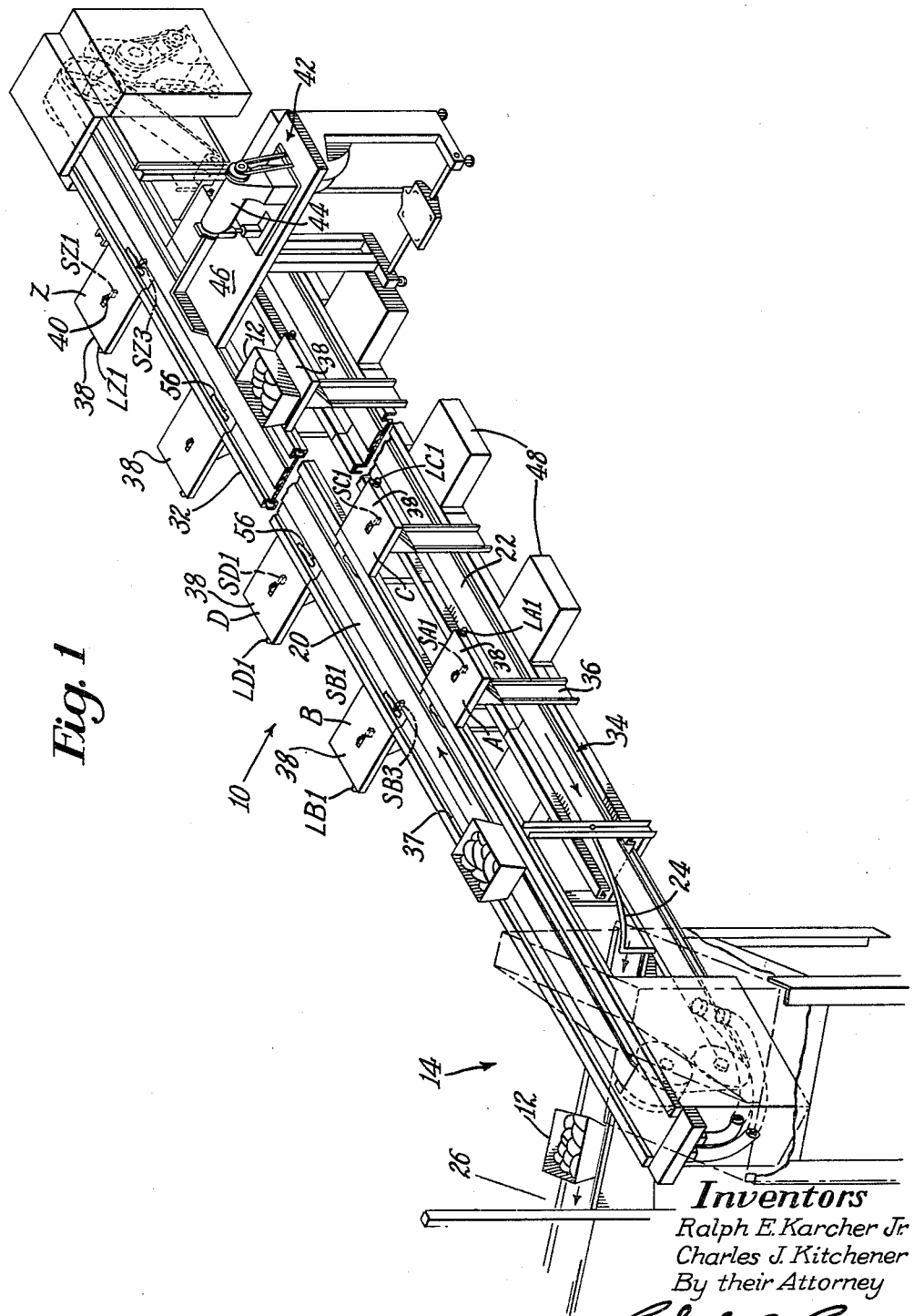

United States Patent Office 3,191,745
Patented June 29, 1965

3,191,745
CONVEYORS
Ralph E. Karcher, Jr., Magnolia, and Charles J. Kitchener, Beverly, Mass., assignors to United Shoe Machinery Corporation, Boston, Mass., a corporation of New Jersey
Filed Apr. 26, 1963, Ser. No. 276,005
3 Claims. (Cl. 198—19)

This invention relates generally to belt conveyor systems of the type in which articles are dispatched from a storage station to various work stations, and returned to the storage station after a predetermined operation has been performed on the article, and has particular reference to a control system adapted for use therewith.

In certain types of manufacturing operations where a number of operations are to be performed on an article at different work stations by different operators, it has been found desirable to return the article to a central storage and dispatch station after completion of the operation at each work station, rather than send it directly to another work station for a subsequent operation. Such a procedure is particularly advantageous in situations where it is desired that the working procedure or order of operations be frequently varied, or where quality control requires frequent inspections of the work in process.

For this purpose it has been proposed to utilize a belt conveyor under the control of a dispatcher at a storage and control station at the head of the belt, the upper run of the belt being utilized to carry articles (which term is meant to include boxes of work) to a position opposite work stations disposed along the belt, the lower run of the belt being utilized to return the articles to the storage station.

Many methods have been proposed for controlling the operation of this type of conveyor to insure that an article is dispatched to the desired work station. Some systems contemplate the use of a continuously moving belt, with automatic means for diverting, pushing, pivoting, or tilting the article off the conveyor at the proper work station; however, such systems require complex and expensive article removing mechanism at each work station. It has therefore been considered desirable to provide a system in which the belt stops automatically when the article has reached the desired work station, to permit the box to be removed manually by an operator at the work station. A number of methods have been proposed for use with such systems to detect the arrival of the article at the work station, such as magnetic, optical, or electro-mechanical means. However, all such means heretofore suggested have been too expensive to be incorporated into a commercial apparatus for use in manufacturing operations having a low profit margin.

It has been proposed that for economy of construction, control means should be incorporated into the dispatchers control panel which would permit the dispatcher to preset electrically the distance to be traveled by the conveyor, which would, in effect, determine the work station to which the article is to be delivered. Although such systems have been used commercially to some extent, they have been subject to a number of disadvantages such as complex and expensive circuitry, and the fact that such systems are not readily adaptable to multiple feeding; that is, they do not permit a second article to be placed on the belt and dispatched to a work station until the first article has arrived at its intended station and has been removed.

The object of this invention is to provide a belt conveyor system of the type described in which means is provided under the control of a dispatcher for substantially simultaneously dispatching a number of articles to different work stations.

A further object of the invention is to provide, in such a conveyor system, means responsive to the removal of a delivered article at a work station to restart the belt to deliver a second article to a second preselected work station.

In the drawing:

FIG. 1 is an isometric view of a conveyor system embodying the features of the invention;

FIG. 2 is an isometric view of a work station of the conveyor of FIG. 1;

FIG. 3 is an isometric view of a control panel of the conveyor of FIG. 1;

Figure 4:
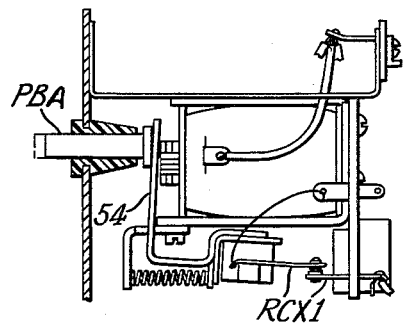
FIG. 4 is a view in section taken on line IV—IV of FIG. 5.
Figure 5:
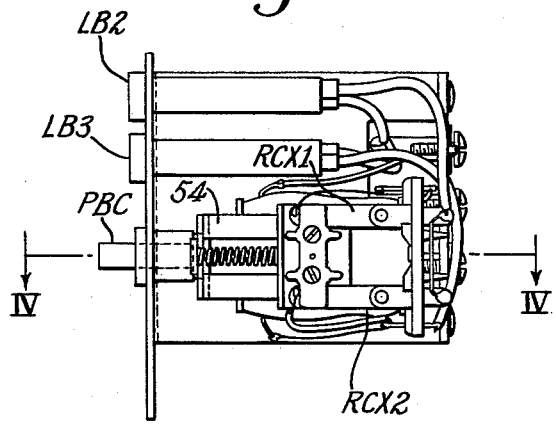
FIG. 5 is a view in side elevation of a portion of the control panel illustrating one of the control relays.

Referring to the drawings, there is illustrated a belt conveyor system 10, which is adapted to transfer articles, such as boxes 12 containing work in process, from a storage and dispatch station 14 to work stations A, B, C, D, etc. disposed alongside the conveyor. In the illustrated embodiment the conveyor comprises a belt having an upper run 20 for carrying boxes of work from the dispatch station to a position opposite any of the work stations, and a lower run 22 for returning boxes of work toward the dispatch station to a diverting mechanism 24 and into a collecting conveyor 26. The collecting conveyor 26 feeds the boxes to a position adjacent to a storage rack (not shown) which may have a plurality of compartments adapted to receive the boxes from the rear side, and to permit removal by the dispatcher from the front side for placing onto the head end of the conveyor.

Figure 6:
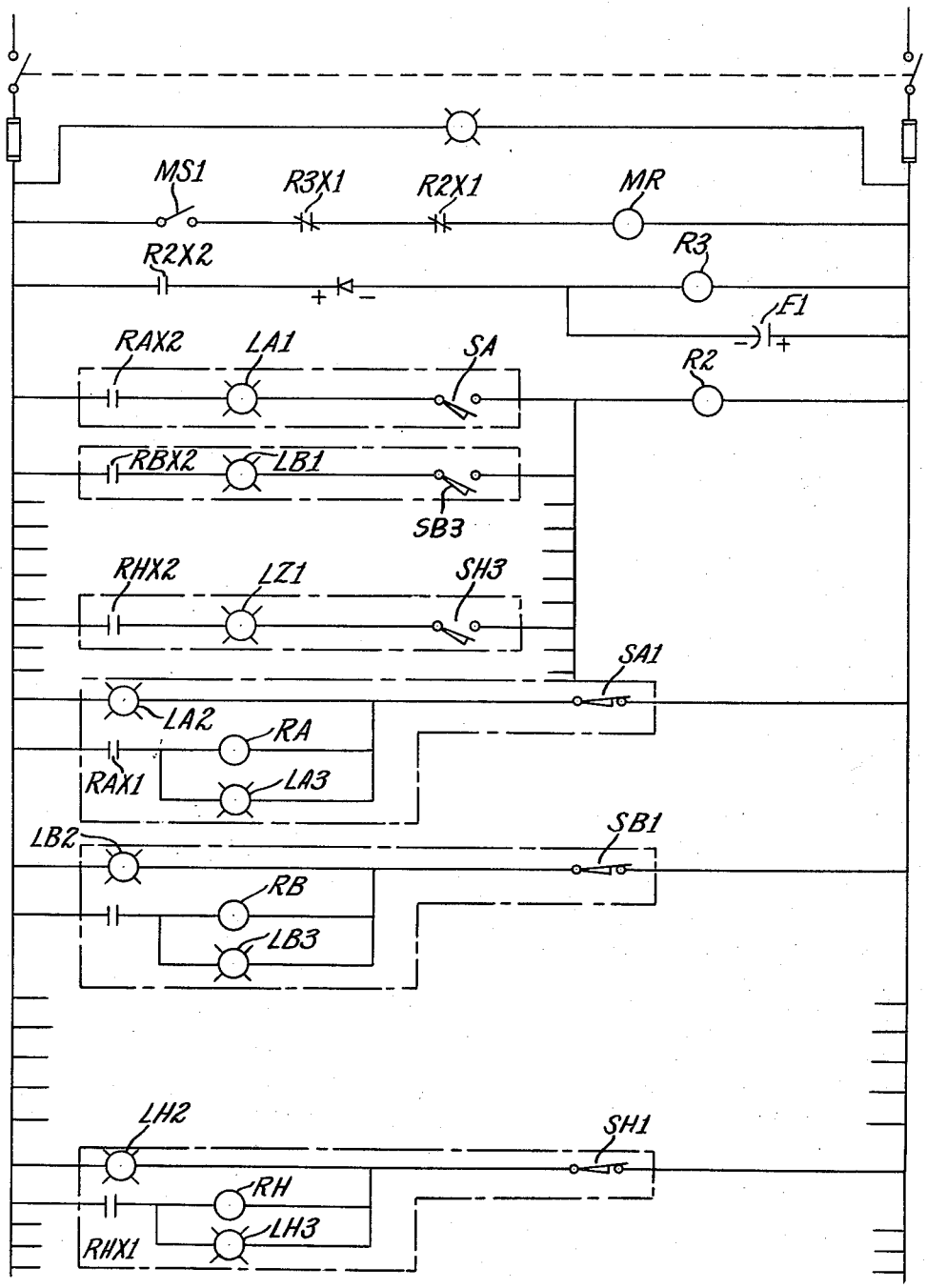
FIG. 6 is a schematic diagram of the control circuit of the conveyor.

The supporting structure for the belt is preferably formed in modules having a length equal to the desired distance between work stations and comprises upper and lower belt supporting members 32 and 34 which are supported by suitable legs 36. The upper belt support 32 is in the illustrated embodiment, channel shaped, with side walls 37 spaced apart a distance substantially greater than the width of the belt. Disposed alongside the upper belt support 32 at each work station is a reserve box storage platform 38. Mounted in the surface of said platform 38 is a spring-loaded lever 40 which normally projects a small distance above said surface and is adapted to be depressed by the weight of a box of work resting on said surface. The lever 40 at each station operates a first switch (SA1, SB1, SC1, etc. in FIG. 6) which is of the normally closed type, but is held open when a box of work is present on surface 38.

Also disposed at each work station is a work table 42 which extends generally at a right angle to the belt, with a work machine 44 such as a sewing machine or the like mounted on the table in spaced relation to the belt, to leave a work surface 46 between the machine and the belt to receive a box of work. A signal light (LA1, LB1, LC1) is provided at each work station in view of the operator with said light being adapted to be energized when a box of work has been dispatched to the station as will appear hereinafter. A return box platform 48 is disposed beneath the work table 42 at the same height as the lower level of the belt.

The belt is driven over pulleys by a suitable main drive motor which is energized through control means in a manner to appear hereinafter.

The operation of the conveyor is controlled by the dispatcher by means of a control panel 50 at the head of the conveyor. The panel 50 is provided with indicating and control means comprising, for each work station, a pair of signal lights (LA2, LA3, LB2, LB3, LC2, LC3, etc.) and a push button (PBA, PBB, etc.).

Each push button is associated with a relay (RA, RB, etc., as in FIG. 6) each relay being disposed on the rear side of the panel, so positioned that when its push button is depressed, the armature 54 of the relay is depressed to close two pairs of relay contacts (RAX1, RAX2, RBX1, RBX2, etc.) to actuate certain other circuit elements to appear hereinafter.

Disposed at each work station on the upper belt support 32 is a switch arm 56 (FIG. 1) which projects above the upper surface of the belt and is adapted to be depressed when a box of work traveling on the belt passes thereover, to close a switch (SA3, SB3, etc.) associated with the arm.

In the illustrated embodiment of the invention, the belt runs continuously, except when it stops automatically to permit an operator to remove a box of work. The belt motor is energized by closing start switch MS1 (see FIG. 6) which energizes motor starting relay MR.

During normal operation of the system, the operator at each work station will have a box of work on the work table 42, and a reserve box of work on the reserve box storage platform 38, so that the switches SA1, SB1, etc. are open. When an operator, for example, at station B, finishes with the work in the box on the work table, she places it on the return box platform and pushes it onto the lower run of the belt, so that it is carried back to the storage rack. Thereafter she transfers the reserve box from the reserve storage platfom 38 to the work table 42. Removal of the box from the platform 38 allows lever 40 to close the switch SB1, which completes a circuit as far as the actuating coil of relay RB and energizes demand indicating light LB2 at the control panel. The dispatcher observes that a box of work is needed at station B, removes an appropriate box of work from the storage rack, presses the push button PBB on the control panel and places the box on the conveyor.

Push button PBB when depressed moves the armature 54 of relay RB to close relay contacts RBX1 and RBX2. The closing of contact RBX1 completes a latching circuit to the coil of relay RB to latch the contacts closed, and also energizes light LB3 on the control panel, showing the dispatcher that a box of work is traveling to work station B. The closing of contacts RBX2 completes a circuit to the normally open switch SB3 at work station B, so that when the box of work arrives at station B and depresses lever 56, switch SB3 is closed to complete a circuit to relay R2, which immediately opens contacts R2X1 to break the motor circuit and stop the belt. Relay R2 also closes contacts R2X2, to energize relay R3 which opens contacts R3X1 also in the motor circuit.

The closing of switch SB3 on arrival of the box at the work station also energizes light LB1 to signal the operator that her box of work has arrived.

The operator then removes the box of work from the belt, which open switch SB3, and places the box on her reserve box platform thereby closing switch LB1. The opening of switch SB3 extinguishes the work station light LB1 and breaks the circuit to relay R2, which opens contacts R2X2, and closes contacts R2X1, so that only contacts R3X1 are left open in the motor circuit. Opening of contacts R2X2 breaks the circuit to relay R3. However, the capacitor F1 in parallel with R3 causes a short time delay before the relay is de-energized to close contacts R3X1 to restart the belt. This time delay enables the operator to get the box completely off the belt before the belt again starts to move.

The above described conveyor and control system is adapted to multiple feeding of work boxes to different work stations, as will now be described.

In the above described operation, immediately after the operator has placed the box of work on the belt for station B, another box may be placed on the belt for any other station downstream of station B, for example, for station Z with push button PBZ being depressed by the dispatcher. Hence after the conveyor restarts in response to the removal of the box of work at station B, the second box of work will be carried by the conveyor as far as station Z, where the closing of switch SZ3 by the box stops the conveyor in the manner previously described, until the operator at station Z removes the box and places it in her reserve box platform.

It will be apparent that any number of boxes may be fed in succession, provided that the boxes are placed on the belt in the same order in which the stations to which they are to be delivered are disposed along the belt. In other words, when a group of boxes is fed in rapid sequence, the boxes must be placed on the belt in order of the distance of their destination from the head of the belt. It will also be apparent that even though a box is on the belt traveling to a distant station, a box may be placed on the belt for a nearer station provided the box traveling to the distant station has passed said nearer station before the dispatcher has pressed the push button to energize the belt stopping switch at said nearer station.

During normal operation of the conveyor, the dispatcher can send a box of work only to a work station that does not have a box of work on the reserve platform, since if a box of work is present on the platform, pressing the relay push button corresponding to that station does not create the latching circuit to the relay.

However, on some occasions the dispatcher desires to send a box of work to a station which already has a box on the reserve platform, for example, when a box of work must be completed out of the usual order, or when a box contains defective work that must be returned for repair. In such case the dispatcher can send a box of work to the station by placing the box on the belt and after observing that there are no other boxes on the belt between that station and the dispatch station, pressing the push button corresponding to that station and manually holding said button in the depressed position so that the relay contacts are held closed. Hence when the box arrives at the station the closing of switch S3 at that station by the box stops the belt in the manner previously described.

Since certain obvious changes may be made in the disclosed device without departing from the scope of the invention, it is intended that all matter contained herein be interpreted in an illustrative and not a limiting sense.

Having thus described our invention what we claim as new and desire to secure by Letters Patent of the United States is:

1. A conveyor system, comprising conveying means, a dispatch station and a series of work stations disposed along the conveying means, each work station having a storage position and a first detecting means associated therewith for detecting the presence or absence of an article in the storage position, second detecting means associated with each work station for detecting the presence of an article carried on the conveyor belt, means responsive to the detection by said second means of an article approaching the work station on the conveyor to stop the conveyor, said second detecting means being activatable only when an article is not detected by said first detecting means.

2. A conveyor system, comprising conveying means, a dispatch station and a series of work stations disposed along the conveying means, each of said work stations having a storage platform with a first article detecting means associated therewith, a second article detecting means associated with each work station for detecting an article being conveyed by the conveying means, said second article detecting means having an activated and a nonactivated condition, said first detecting means being responsive to the lack of an article on the storage platform of a work station to energize means at the dispatch station for enabling an operator at the dispatch station to place said second article detecting means in the activated condition, means responsive to the detection by said activated second detection means of an article carried by the conveying means to stop the conveying means, and means responsive to the removal of said article from operative relation to the second detecting means for restarting the conveyor.

3. A conveyor system, comprising conveying means, a dispatch station and a series of work stations disposed along the conveying means, a relay at the dispatch station corresponding to each work station, each relay comprising first and second sets of contacts, electrical means for closing said contacts and mechanical means controllable by a dispatcher at the dispatch station for closing said contacts, operator controlled means at the work station for activating said electrical means, the first set of said contacts when closed after said electrical means is activated causing actuation of the electrical means to maintain said two sets of contacts in the closed condition, article detecting means at each work station responsive to the detection of an article traveling on the conveying means to stop said conveying means, said article detecting means being activated only when the second set of contacts is closed.

References Cited by the Examiner
UNITED STATES PATENTS 2,776,730 1/57 Crawford _____ 148—37 X
3,116,823 1/64 Schneider _____ 148—127

SAMUEL F. COLEMAN, *Primary Examiner.*

WILLIAM B. LA BORDE, *Examiner.*